US012713334B2

(12) United States Patent
Cariou

(10) Patent No.: US 12,713,334 B2
(45) Date of Patent: Aug. 18, 2026

(54) APPARATUS, SYSTEM, AND METHOD OF LINK DISABLEMENT OF AN ACCESS POINT (AP)

(71) Applicant: Intel Corporation, Santa Clara, CA (US)

(72) Inventor: Laurent Cariou, Milizac (FR)

(73) Assignee: INTEL CORPORATION, Santa Clara, CA (US)

( * ) Notice: Subject to any disclaimer, the term of this patent is extended or adjusted under 35 U.S.C. 154(b) by 88 days.

(21) Appl. No.: 17/561,325

(22) Filed: Dec. 23, 2021

(65) Prior Publication Data

US 2022/0116862 A1 Apr. 14, 2022

Related U.S. Application Data

(60) Provisional application No. 63/250,811, filed on Sep. 30, 2021.

(51) Int. Cl.
*H04W 48/16* (2009.01)
*H04W 72/51* (2023.01)
*H04W 76/15* (2018.01)

(52) U.S. Cl.
CPC ........... *H04W 48/16* (2013.01); *H04W 72/51* (2023.01); *H04W 76/15* (2018.02)

(58) Field of Classification Search
CPC ...... H04W 48/16; H04W 76/15; H04W 72/51
USPC .......................................................... 370/329
See application file for complete search history.

(56) References Cited

U.S. PATENT DOCUMENTS

2021/0212156 A1* 7/2021 Kwon .................... H04W 76/34
2022/0022087 A1* 1/2022 Chu .................. H04W 28/0268
2022/0377839 A1* 11/2022 Jang ....................... H04W 76/15
2023/0031933 A1* 2/2023 Wang .................... H04W 76/40

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

* cited by examiner

*Primary Examiner* — Faisal Choudhury
(74) *Attorney, Agent, or Firm* — Shichrur & Co.

(57) ABSTRACT

For example, an Access Point (AP) Multi-Link Device (MLD) and/or a non-AP MLD may be configured to utilize a mechanism configured to support link disablement of an AP. For example, the AP MLD may be configured to transmit from an AP of the AP MLD a broadcast frame including a link disable advertisement, the link disable advertisement to advertise a link disablement of the AP for all non-AP MLDs associated with the AP, the link disablement of the AP to indicate that the AP is to be unavailable for communication with all the non-AP MLDs associated with the AP; and disable communication of beacon frames and response frames from the AP based on the link disable advertisement.

20 Claims, 7 Drawing Sheets

DS

DSM

Multi-link AP logical entity

AP1 operating on 2.4 GHz

AP2 operating on 5 GHz

AP3 operating on 6 GHz

302

312

314

316

Link 1

Link 2

Link 3

372

374

376

Multi-link non-AP logical entity

Non-AP STA1

Non-AP STA2

Non-AP STA3

340

352

354

356

300

APPARATUS, SYSTEM, AND METHOD OF LINK DISABLEMENT OF AN ACCESS POINT (AP)

CROSS REFERENCE

This application claims the benefit of and priority from U.S. Provisional Patent Application No. 63/250,811 entitled "RULES FOR ACCESS POINT (AP) DISABLEMENT WITH REGARDS TO TRAFFIC IDENTIFIER (TID)-TO-LINK MAPPING", filed Sep. 30, 2021, the entire disclosure of which is incorporated herein by reference.

TECHNICAL FIELD

Aspects described herein generally relate to link disablement of an Access Point (AP).

BACKGROUND

Devices in a wireless communication system may be configured to communicate according to communication protocols, which may utilize a wireless communication link, which may be established between a first device, e.g., an Access Point (AP), and a second device, e.g., a non-AP wireless communication station.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
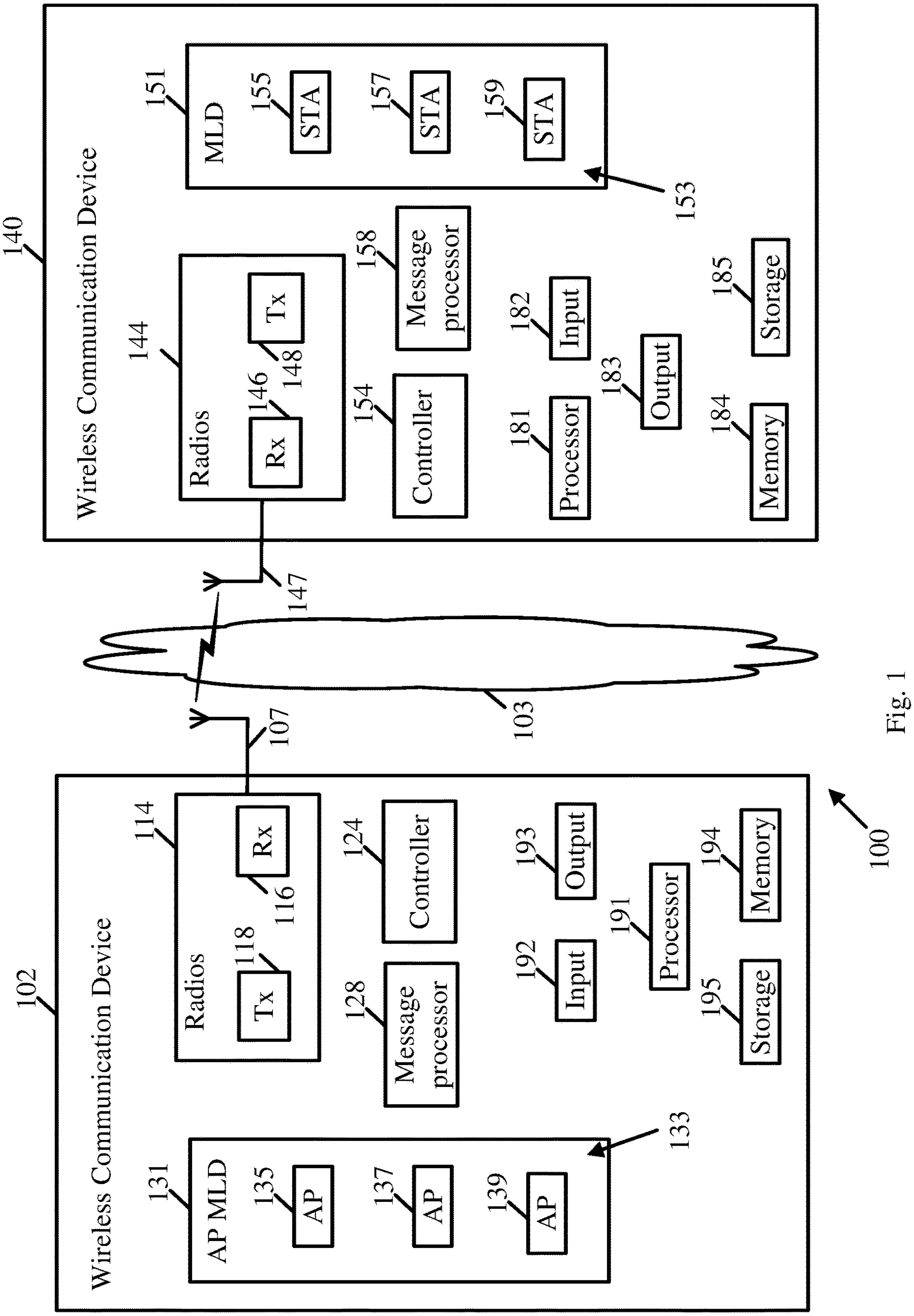
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (IEEE 802.11-2020, *IEEE Standard for Information Technology—Telecommunications and Information Exchange between Systems Local and Metropolitan Area Networks—Specific Requirements*; Part 11: *Wireless LAN Medium Access Control (MAC) and Physical Layer (PHY) Specifications*, December, 2020); and/or IEEE 802.11be (IEEE P802.11be/D1.2 *Draft Standard for Information technology—Telecommunications and information exchange between systems Local and metropolitan area networks—Specific requirements*; Part 11: *Wireless LAN Medium Access Control (MAC) and Physical Layer (PHY)* Specifications; Amendment 8: *Enhancements for extremely high throughput (EHT)*, September 2021)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more antennas.

In some demonstrative embodiments, device 102 may include one or more antennas 107, e.g., a single antenna 107 or a plurality of antennas 107, and/or device 140 may include one or more antennas 147, e.g., a single antenna 147 or a plurality of antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF).The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
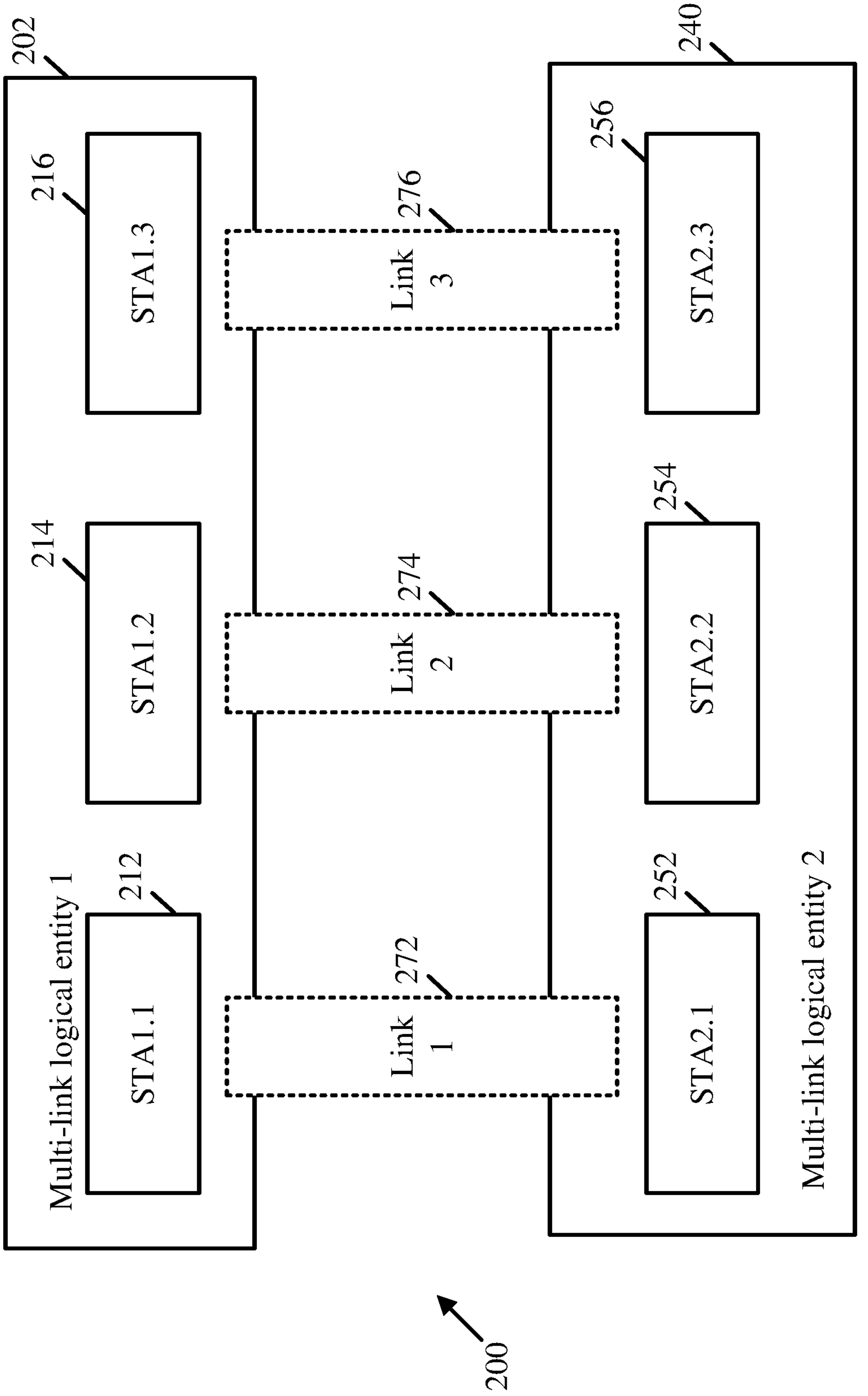
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
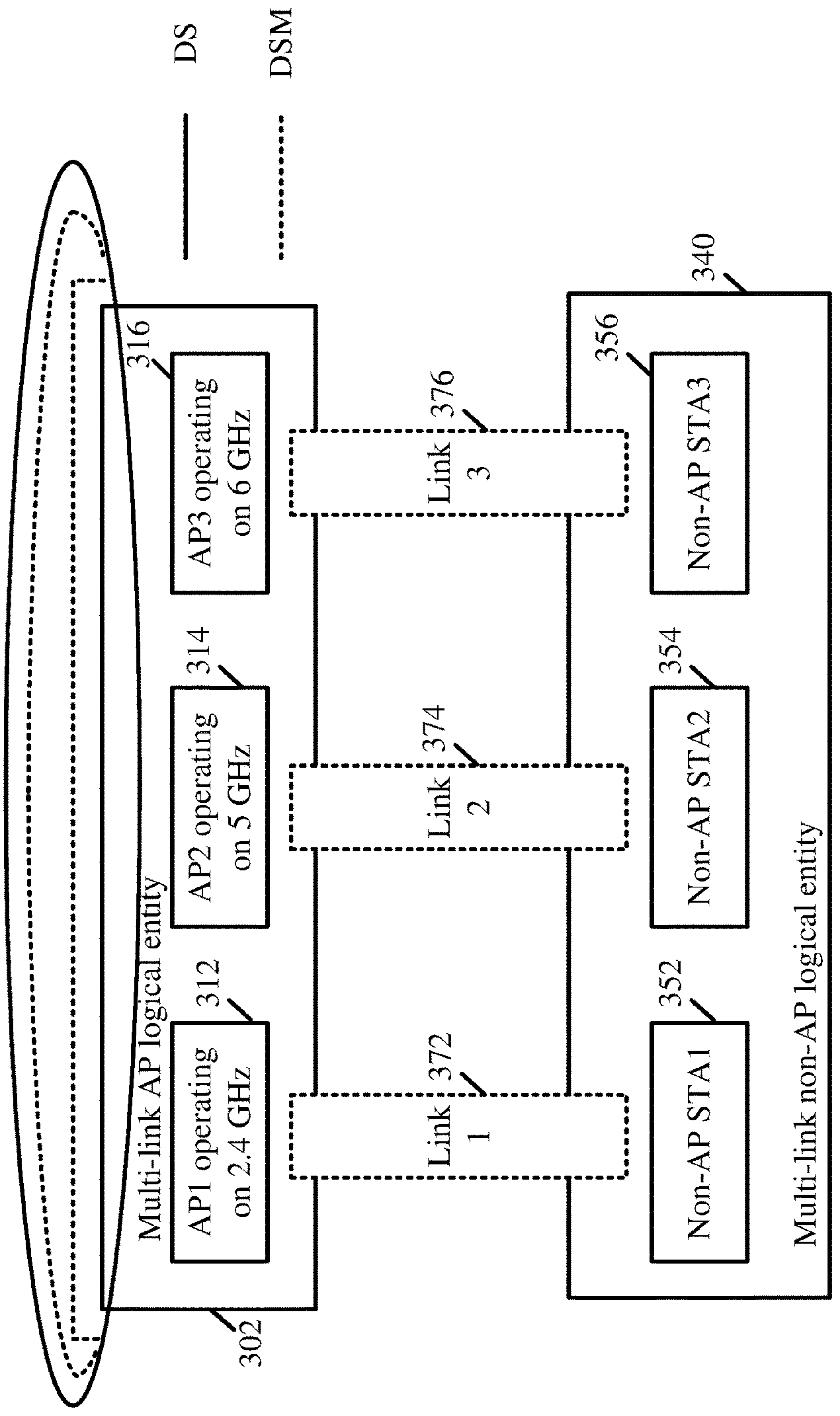
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 316, may be configured to communicate over any other additional or alternative wireless communication frequency bands.

Referring back to FIG. 1, in some demonstrative aspects, an AP MLD, e.g., an AP MLD implemented by device 102, and/or a non-AP MLD, e.g., a non-AP MLD implemented by device 140, may be configured to perform one or more operations for establishing a link, for example, to operate on a link with a multi-link framework, e.g., as described below.

For example, the AP MLD implemented by device 102 and/or the non-AP MLD implemented by device 140 may be configured to perform a first procedure (procedure 1) of a multi-link setup signaling exchange, which may be executed over one link initiated by a multi-link non-AP logical entity, e.g., the non-AP MLD, with a multi-link AP logical entity, for example, the AP MLD, e.g., as follows:

- Capability for one or more bidirectional links may be exchanged during the multi-link setup signaling exchange.
- The multi-link AP logical entity may serve as an interface to a distribution system (DS) for the multi-link non-AP logical entity, for example, after successful multi-link setup signaling exchange.

At the end of procedure 1 some links may be set-up.

For example, the AP MLD implemented by device 102 and/or the non-AP MLD implemented by device 140 may be configured to perform a second procedure (procedure 2) to determine, for example, during or after successful completion of the multi-link setup, which bidirectional link(s)

is(are) enabled for frame exchange, e.g., class 2 and class 3 frame exchange, for example, after the multi-link setup, e.g., as described below.

For example, procedure 2 may be captured, e.g., entirely captured, under a Traffic Identifier (TID) link mapping function, which may enable, for example, to map all TIDs to a set of setup links.

For example, at any point in time, a TID may be mapped, e.g., shall always be mapped, to at least one link that is set up.

For example, TID to link mapping may be updated, for example, after the multi-link setup, e.g., through a negotiation, which may be initiated, for example, by any multi-link logical entity (MLLE).

For example, a link may be enabled, for example, when that link is used to exchange frames subject to STA power states, and/or when at least one TID is mapped to that link.

For example, when a link is disabled, i.e. not enabled, by an MLLE, the frame exchanges may not be possible, and/or TIDs may not be mapped to the link.

For example, the AP MLD implemented by device 102 and/or the non-AP MLD implemented by device 140 may be configured to perform a third procedure (procedure 3) with respect to one or more power states per link, e.g., as described below.

For example, frame exchange may happen on one or more enabled links, e.g., each of the enabled links, for example, when the STA is in an awake state. In one example, frame exchange may happen on one or more enabled links, e.g., each of the enabled links, for example, only when the STA is in an awake state, and not when it is in doze state. For example, power management protocols may be followed, for example, in order to allow state transitions that are controlled by the STA, and/or negotiated and/or planned ahead between the AP and the STA, for example, like a Target Wake Time (TWT).

For example, when procedure 2 is completed, an MLLE STA and an MLLE AP may operate and exchange frames on one or more of, e.g., each of, the enabled links, for example, when the STA is in the awake state.

For example, there may be one or more ways for a link to be enabled, e.g., as described below.

In one example, a link may be enabled through a multi-link setup phase, which incorporates signal for link mapping, or which does not incorporate signal for link mapping. For example, in case that signal for link mapping is not incorporated, a default mapping may be applied, e.g., all TIDs may be mapped to all setup links.

In another example, a link may be enabled through a TID-link mapping update negotiation, for example, after the multi-link setup.

In some demonstrative aspects, an AP ML, e.g., the AP MLD implemented by device 102, and/or a non-AP MLD, e.g., the non-AP MLD implemented by device 140, may be configured to implement a link disable/re-enable mechanism, which may support a technical solution to allow an AP MLD to disable and/or re-enable a link, e.g., as described below.

In some demonstrative aspects, the link disable/re-enable mechanism may be configured to support a technical solution to allow an AP MLD to disable and/or re-enable a link, for example, for a purpose of AP power save, e.g., as described below.

In some demonstrative aspects, the link disable/re-enable mechanism may be configured to utilize one or more rules to support disabling and/or re-enabling of the link, e.g., as described below.

In some demonstrative aspects, the link disable/re-enable mechanism may be configured to utilize one or more of the following rules, for example, to enable/disable a link for a non-AP MLD:

- By default, all TIDs shall be mapped to all setup links for both DL and UL, e.g., in accordance with an IEEE 802.11be Specification. When both MLDs have explicitly negotiated a TID-to-link mapping by following a procedure, e.g., defined in accordance with the IEEE 802.11be Specification, a TID can be mapped to a link set, which is a subset of setup links, spanning from only one setup link to all the setup links, with restrictions, e.g., defined in accordance with the IEEE 802.11be Specification.
- A setup link is defined as enabled for a non-AP MLD if at least one TID is mapped to that link either in DL or in UL and is defined as disabled if no TIDs are mapped to that link both in DL and UL. At any point in time, a TID shall always be mapped to at least one setup link both in DL and UL, which means that a TID-to-link mapping change is only valid and successful if it will not result in having a single TID for which the link set is made of zero setup links. By default, all setup links shall be enabled, e.g., in accordance with the IEEE 802.11be Specification.
- If a link is enabled for a non-AP MLD, it may be used for individually addressed frame exchange, subject to the power state of the non-AP STA operating on that link and only MSDUs or A-MSDUs with TIDs mapped to that link may be transmitted on that link between the corresponding STA and AP of the non-AP MLD and AP MLD in the direction (DL/UL) corresponding to the TID-to-link mapping. Individually addressed Management frames and Control frames may be sent on any enabled links between the corresponding STA and AP of the non-AP MLD and AP MLD both in DL and UL.
- If a link is disabled for a non-AP MLD, it shall not be used for individually addressed frame exchange between the corresponding STA and AP of the non-AP MLD and AP MLD, except for class 1 and 2 Management frames, class 1 Control frames and TID-to-link Mapping Request, TID-to-link Mapping Response and TID-to-link Mapping Teardown frames.

In some demonstrative aspects, controller 124 may be configured to cause an AP MLD implemented by device 102, e.g., AP MLD 131, to transmit from an AP of the AP MLD, e.g., AP 135, a broadcast frame including a link disable advertisement, e.g., as described below.

In some demonstrative aspects, the link disable advertisement may be configured to advertise a link disablement of the AP, e.g., AP 135, for example, for all non-AP MLDs associated with the AP, e.g., as described below.

In some demonstrative aspects, the link disablement of the AP, e.g., AP 135, may be configured to indicate that the AP is to be unavailable, for example, for communication with all the non-AP MLDs associated with the AP, e.g., as described below.

In some demonstrative aspects, controller 124 may be configured to cause the AP MLD implemented by device 102, e.g., AP MLD 131, to disable communication of beacon frames and response frames from the AP, e.g., AP 135, for example, based on the link disable advertisement, e.g., as described below.

In some demonstrative aspects, the broadcast frame may include a beacon frame, e.g., as described below.

In other aspects, the broadcast frame may include any other additional or alternative type of frame.

In some demonstrative aspects, controller 124 may be configured to cause radio 114 to transmit the broadcast frame, e.g., as described below.

In some demonstrative aspects, controller 124 may be configured to cause the AP MLD implemented by device 102, e.g., AP MLD 131, to transmit from another AP of the AP MLD, e.g., AP 137, the link disable advertisement to advertise a link disablement of the AP, e.g., AP 135, to be unavailable for communication, e.g., as described below.

In some demonstrative aspects, controller 124 may be configured to cause the AP MLD implemented by device 102, e.g., AP MLD 131, to transmit from all APs of the AP MLD, e.g., from each of APs 135, 137, and 139, the link disable advertisement to advertise a link disablement of the of the AP, e.g., AP 135, to be unavailable for communication, e.g., as described below.

In some demonstrative aspects, controller 124 may be configured to cause the AP MLD implemented by device 102, e.g., AP MLD 131, to determine whether the link disablement of the AP is allowed, for example, based on a condition corresponding to the non-AP MLDs associated with the AP, e.g., as described below.

In some demonstrative aspects, the condition may be configured to prohibit the link disablement of the AP, e.g., AP 135, for example, based on a determination that a non-AP MLD, e.g., non-AP MLD 151, has only one link with the AP MLD, and the only one link is between the non-AP MLD and the AP, e.g., as described below.

In some demonstrative aspects, the condition may be configured to prohibit the link disablement of the AP, for example, based on a determination that a legacy device, which is a non-MLD device, is associated with the AP, e.g., as described below.

In some demonstrative aspects, the condition may be configured to allow the disablement of the AP, e.g., AP 135, for example, based on a determination that there is no non-AP MLD having only one link with the AP MLD, and the only one link is between the non-AP MLD and the AP, e.g., as described below.

In some demonstrative aspects, the condition may be configured to allow the disablement of the AP, e.g., AP 135, for example, based on a determination that there is no legacy device, which is a non-MLD device, associated with the AP, e.g., as described below.

In some demonstrative aspects, the condition may be configured to allow the disablement of the AP, e.g., AP 135, for example, only based on a determination that there is no non-AP MLD having only one link with the AP MLD, and the only one link is between the non-AP MLD and the AP; and that there is no legacy device, which is a non-MLD device, associated with the AP, e.g., as described below.

In some demonstrative aspects, the link disable advertisement may be configured to indicate to a non-AP MLD, e.g., non-AP MLD 151, that a link between the non-AP MLD and the AP, e.g., AP 135, is to be disabled for any Uplink (UL) or Downlink (DL) communication by the non-AP MLD, e.g., as described below.

In some demonstrative aspects, the link disable advertisement may be configured to indicate to a non-AP MLD, e.g., non-AP MLD 151, that a link between the non-AP MLD and the AP, e.g., AP 135, is not to be used by the non-AP MLD, e.g., as described below.

In some demonstrative aspects, the link disable advertisement may be configured to indicate to a non-AP MLD, e.g., non-AP MLD 151, that a link between the non-AP MLD and the AP, e.g., AP 135, is not to be used by the non-AP MLD, for example, even if the link between the non-AP MLD and the AP is enabled per a Traffic Identifier (TID) to link (TID-to-link) mapping negotiation between the non-AP MLD and the AP MLD, e.g., as described below.

In some demonstrative aspects, the link disable advertisement may be configured to indicate to a non-AP MLD, e.g., non-AP MLD 151, that a TID-to-link mapping is to be updated by the non-AP MLD, for example, to identify that no TIDs are mapped to a link of the AP, e.g., as described below.

In some demonstrative aspects, controller 124 may be configured to cause the AP MLD implemented by device 102, e.g., AP MLD 131, to transmit from the AP, e.g., AP 135, a first broadcast frame including the link disable advertisement, e.g., as described below.

In some demonstrative aspects, controller 124 may be configured to cause the AP MLD implemented by device 102, e.g., AP MLD 131, to disable communication of beacon frames and response frames from the AP, e.g., AP 135, for example, based on the link disable advertisement in the first broadcast frame, e.g., as described below.

In some demonstrative aspects, controller 124 may be configured to cause the AP MLD implemented by device 102, e.g., AP MLD 131, to transmit from the AP, e.g., AP 135, a second broadcast frame including a link re-enable advertisement to advertise a link re-enablement of the AP, e.g., as described below.

In some demonstrative aspects, controller 124 may be configured to cause the AP MLD implemented by device 102, e.g., AP MLD 131, to transmit the second broadcast frame after the first broadcast frame, e.g., as described below.

In some demonstrative aspects, controller 124 may be configured to cause the AP MLD implemented by device 102, e.g., AP MLD 131, to re-enable communication of beacon frames and response frames from the AP, e.g., AP 135, for example, based on the link re-enable advertisement in the second broadcast frame, e.g., as described below.

In some demonstrative aspects, controller 124 may be configured to cause the AP MLD implemented by device 102, e.g., AP MLD 131, to configure the link disable advertisement to indicate a timing of a link re-enablement of the AP, e.g., as described below.

In some demonstrative aspects, controller 124 may be configured to cause the AP MLD implemented by device 102, e.g., AP MLD 131, to configure the link disable advertisement including a Channel Switch Announcement (CSA) element and a Max Channel Switch Time element, e.g., as described below.

In some demonstrative aspects, controller 124 may be configured to cause the AP MLD implemented by device 102, e.g., AP MLD 131, to configure the CSA element to indicate a current channel of the AP, e.g., a current channel of the AP 135, e.g., as described below.

In some demonstrative aspects, controller 124 may be configured to cause the AP MLD implemented by device 102, e.g., AP MLD 131, to configure the Max Channel Switch Time element to include a switch time field to define a timing of a link re-enablement of the AP, for example, AP 135, e.g., as described below.

In some demonstrative aspects, controller 154 may be configured to cause a non-AP MLD implemented by device 140, e.g., non-AP MLD 151, to identify a link disablement of a disabled AP of an AP MLD, e.g., AP 135 of AP MLD 131, for example, based on a link disable advertisement in a broadcast frame from the AP MLD, for example, the link disable advertisement in the broadcast frame from the AP MLD 131, e.g., as described below.

In some demonstrative aspects, the link disable advertisement may be configured to indicate that the disabled AP, e.g., AP 135, is to be unavailable for communication with all non-AP MLDs associated with the disabled AP, e.g., as described below.

In some demonstrative aspects, controller 154 may be configured to cause the non-AP MLD implemented by device 140, e.g., non-AP MLD 151, to disable a link between the non-AP MLD and the disabled AP for communication between the non-AP MLD and the AP MLD, for example, based on the link disable advertisement, e.g., as described below.

In some demonstrative aspects, the broadcast frame may include a beacon frame, e.g., as described below.

In other aspects, the broadcast frame may include any other additional or alternative type of frame.

In some demonstrative aspects, controller 154 may be configured to cause the non-AP MLD implemented by device 140, e.g., non-AP MLD 151, to disable the link between the non-AP MLD and the disabled AP, e.g., the link between non-AP MLD 151 and the AP 135, for example, for any UL or DL communication by the non-AP MLD, for example, based on the link disable advertisement, e.g., as described below.

In some demonstrative aspects, controller 154 may be configured to cause the non-AP MLD implemented by device 140, e.g., non-AP MLD 151, to, based on the link disable advertisement, select not to use the link between the non-AP MLD and the disabled AP, e.g., AP 135, for example, even if the link between the non-AP MLD and the disabled AP is enabled per a TID-to-link mapping negotiation between the non-AP MLD and the AP MLD, e.g., as described below.

In some demonstrative aspects, controller 154 may be configured to cause the non-AP MLD implemented by device 140, e.g., non-AP MLD 151, to update a TID-to-link mapping to identify that no TIDs are mapped to the link between the non-AP MLD and the disabled AP, e.g., AP 135, for example, based on the link disable advertisement, e.g., as described below.

In some demonstrative aspects, controller 154 may be configured to cause the non-AP MLD implemented by device 140, e.g., non-AP MLD 151, to identify a link re-enablement of the disabled AP, e.g., AP 135, for example, based on a link re-enable advertisement in an other broadcast frame from the AP MLD, for example, another broadcast frame from AP MLD 131, e.g., as described below.

In some demonstrative aspects, controller 154 may be configured to cause the non-AP MLD implemented by device 140, e.g., non-AP MLD 151, to re-enable the link between the non-AP MLD and the disabled AP, e.g., AP 135, for communication between the non-AP MLD and the AP MLD, for example, based on the link re-enable advertisement, e.g., as described below.

In some demonstrative aspects, controller 154 may be configured to cause the non-AP MLD implemented by device 140, e.g., non-AP MLD 151, to re-enable the link between the non-AP MLD and the disabled AP, e.g., AP 135, for example, for any UL or DL communication by the non-AP MLD, for example, based on the link re-enable advertisement, e.g., as described below.

In some demonstrative aspects, controller 154 may be configured to cause the non-AP MLD implemented by device 140, e.g., non-AP MLD 151, to, based on the link re-enable advertisement, select to use the link between the non-AP MLD and the disabled AP, e.g., AP 135, for example, based on enabling of the link between the non-AP MLD and the disabled AP, for example, per a TID-to-link mapping negotiation between the non-AP MLD and the AP MLD, e.g., as described below.

In some demonstrative aspects, controller 154 may be configured to cause the non-AP MLD implemented by device 140, e.g., non-AP MLD 151, to update a TID-to-link mapping to identify that all TIDs are mapped to the link between the non-AP MLD and the disabled AP, e.g., AP 135, for example, based on the link re-enable advertisement, e.g., as described below.

In some demonstrative aspects, controller 154 may be configured to cause the non-AP MLD implemented by device 140, e.g., non-AP MLD 151, to determine a timing of a link re-enablement of the disabled AP, e.g., AP 135, for example, based on the link disable advertisement, e.g., as described below.

In some demonstrative aspects, controller 154 may be configured to cause the non-AP MLD implemented by device 140, e.g., non-AP MLD 151, to identify the link disable advertisement, for example, based on a CSA element and a Max Channel Switch Time element in the broadcast frame, e.g., as described below.

In some demonstrative aspects, the CSA element may be configured to indicate a current channel of the disabled AP, e.g., as described below.

In some demonstrative aspects, the Max Channel Switch Time element may include a switch time field to define a timing of a link re-enablement of the disabled AP, e.g., as described below.

In some demonstrative aspects, device 102 and/or device 140 may be configured to implement a link disable/re-enable mechanism, which may be configured to provide a technical solution to allow an AP MLD, e.g., an AP MLD implemented by device 102, to disable a link for all associated non-AP MLDs, e.g., including a non-AP MLD implemented by device 140, e.g., as described below.

In some demonstrative aspects, the link disable/re-enable mechanism may be configured to provide a technical solution to allow the AP MLD to disable a link for all associated non-AP MLDs, for example, by sending a broadcasted frame advertising the link that is disabled.

In some demonstrative aspects, the link disable/re-enable mechanism may be configured to support a technical solution to allow the AP MLD, e.g., the AP MLD implemented by device 102, to enable the link, for example, by broadcasting an advertisement that the link is re-enabled.

For example, the link disable/re-enable mechanism may define that when an AP MLD, e.g., the AP MLD implemented by device 102, disables/enables a link for all associated non-AP MLDs, then the following should apply:

- The AP may not operate, e.g., shall not operate, as an AP anymore. For example, the AP may not send beacon frames, may not respond to any frames addressed to the AP, and/or may go into doze state.

In some demonstrative aspects, an AP MLD, e.g., the AP MLD implemented by device 102, may be configured to operate according to link disable/re-enable modes, e.g., as described below.

In some demonstrative aspects, the link disable/re-enable mechanism may be defined according to one or e more modes, e.g., some or all of the modes defined below.

For example, according to a first link disable/re-enable mode, it may be defined for the AP MLD that if a link is disabled for the AP MLD, all associated non-AP MLD may update, e.g., shall update, their TID-to-link mapping, for example, so that no TIDs are mapped to the AP MLD's disabled link.

For example, according to the first link disable/re-enable mode, it may be defined for the AP MLD that if a link is enabled for the AP MLD, all associated non-AP MLD that have that link as a setup link may update, e.g., shall update, their TID-to-link mapping, for example, so that all TIDs are mapped to the AP MLD's disabled link.

For example, according to a second link disable/re-enable mode, an AP MLD may disable a link, for example, only if the following conditions are all met:

- there are no legacy devices associated to the AP of the AP MLD operating on that link;
- there are no associated non-AP MLDs that have that link as the only enabled link.

For example, according to a third link disable/re-enable mode, it may be defined that an enable/disable operation on the AP side is decorrelated from a TID-to-link mapping.

For example, the third link disable/re-enable mode may be configured to define that if a link is disabled for an AP MLD, the link may not be used, e.g., shall not be used, for frame exchange by non-AP MLDs, for example, even if that link would be enabled per a current TID-to-link mapping negotiation.

For example, the third link disable/re-enable mode may define that if a link is re-enabled, and if the other conditions are met for the non-AP MLDs, then the non-AP MLDs may consider this link as enabled and may use the link.

For example, the third link disable/re-enable mode may define a rule for a non-AP MLD, e.g., as follows:

- A setup link is defined as enabled for a non-AP MLD, for example, if at least one TID is mapped to that link either in DL or in UL; and/or is defined as disabled for example, if no TIDs are mapped to that link both in DL and UL, or if the AP MLD has disabled the link for the entire BSS. For example, at any point in time, a TID shall always be mapped to at least one setup link both in DL and UL, which means that a TID-to-link mapping change is only valid and successful if it will not result in having a single TID for which the link set is made of zero setup links. For example, by default, all setup links shall be enabled, e.g., in accordance with the IEEE 802.11be Specification.

In some demonstrative aspects, devices 102 and/or 140 may implement a link disable/re-enable mechanism, which may be configured to provide a technical solution to allow an AP MLD, e.g., the AP MLD implemented by device 102, to disable a link for all non-AP MLDs and to define a time at which the link is to be re-enabled.

In some demonstrative aspects, devices 102 and/or 140 may implement a link disable/re-enable mechanism, which may be configured to provide a technical solution to allow an AP MLD, e.g., the AP MLD implemented by device 102, to disable a link for all non-AP MLDs, and to define a time at which the link is to be re-enabled, for example, by using a channel switch announcement mechanism, or an extended channel switch announcement mechanism, e.g., as described below.

In some demonstrative aspects, an AP of an AP MLD, e.g., an AP MLD implemented by device 102, may be configured to send one or more of the following elements to define the time at which the link is to be disabled/re-enabled:

- CSA frame/element, or enhanced CSA frame/element, defining a target operating class/channel as the same as the current operating class/channel.
- A Max Channel Switch Time element defining the Switch Time field as the time during which the AP is not to be operating as an AP/beaconing.

For example, the AP of the AP MLD, e.g., the AP MLD implemented by device 102, may utilize the CSA frame/element and/or the Max Channel Switch Time element, for example, to advertise the time at which a link of the AP MLD will be disabled, e.g., as may be indicated by setting the Switch Time field, and/or a time at which the link is to be re-enabled, for example, by setting the Max Channel Switch Time element. For example, this mechanism may provide a technical solution to allow the AP MLD to advertise the time at which a link of the AP MLD will be disabled, and/or the time at which the link is to be re-enabled, for example, even without having any substantial impact on a TID-to-link mapping and/or association.

In some demonstrative aspects, the link disable/re-enable mechanism may utilize a CSA/eCSA protocol, which may define a way for the AP to define a period during which no transmissions are allowed at the STA side. For example, this period may be defined to be between the channel switch time, and the time at which the AP will start beaconing again.

In some demonstrative aspects, the link disable/re-enable mechanism may utilize the CSA/eCSA protocol, for example, to provide a technical solution, which may be fully orthogonal from the TID-mapping, and/or may be backward compatible. For example, the link disable/re-enable mechanism may utilize the CSA/eCSA protocol, for example, to provide a technical solution to allow an AP to use the link disable/re-enable mechanism, for example, even on all channels, e.g., DFS channels and/or at a 6 GHz band, where all STAs may support the CSA/eCSA protocol.

Figure 4:
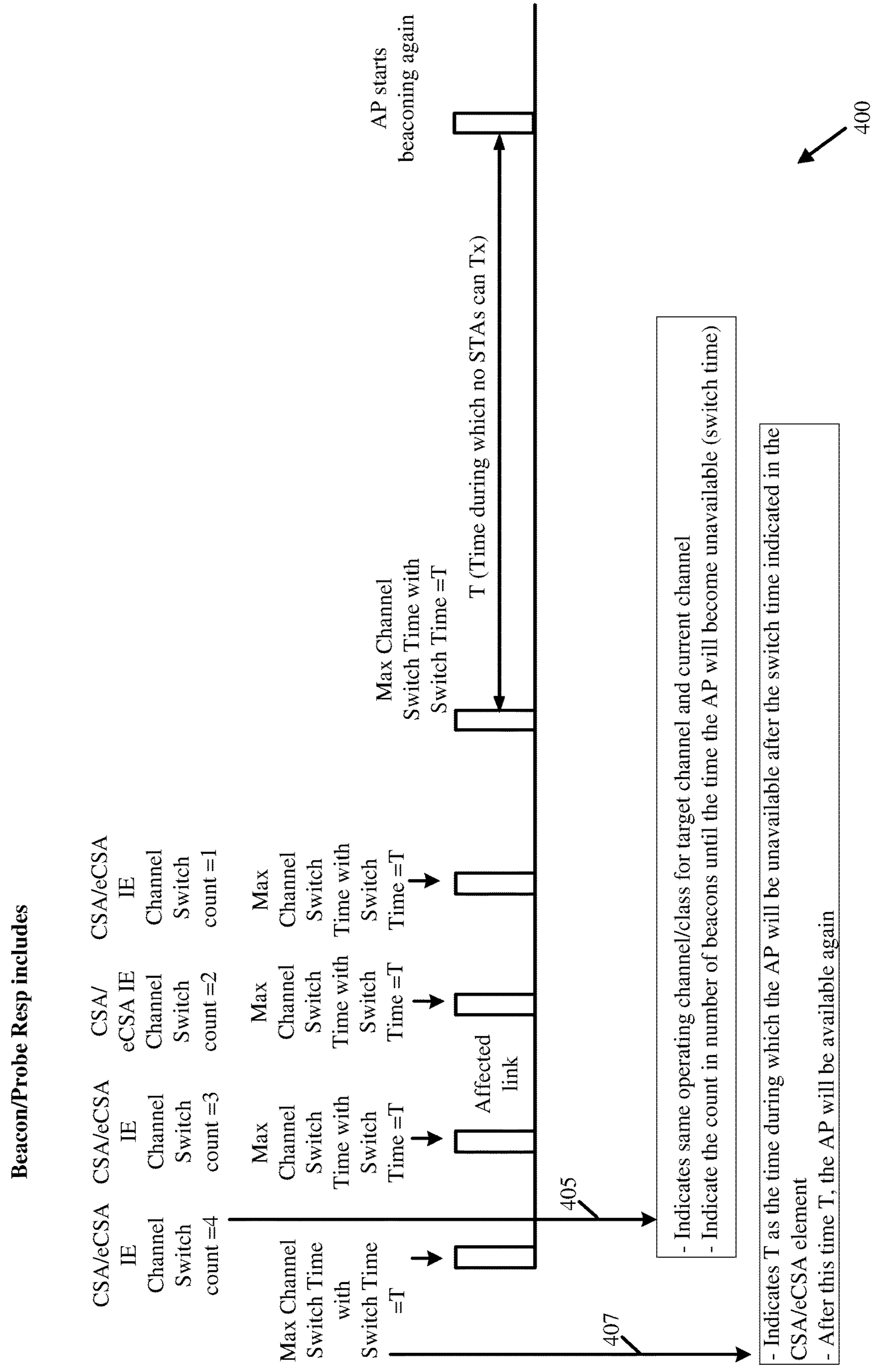
FIG. 4 is a schematic illustration of a signaling scheme for link disablement/enablement, which may be implemented in accordance with some demonstrative aspects.

Reference is made to FIG. 4, which schematically illustrates a signaling scheme 400 for link disablement/enablement, which may be implemented in accordance with some demonstrative aspects.

For example, device 102 (FIG. 1), and/or device 140 (FIG. 1) may be configured to implement signaling scheme 400 to communicate one or more frames to signal a link di s ablement/enablement.

In some demonstrative aspects, an AP, e.g., AP 135 (FIG. 1) implemented by device 102 (FIG. 1), may be configured to transmit a broadcast frame configured to schedule a timing for disable/re-enable of a link of the AP.

In some demonstrative aspects, the broadcast frame may include a beacon/probe response frame.

In other aspects, the broadcast frame may include any other additional or alternative type of frame.

In some demonstrative aspects, as shown in FIG. 4, the frame may include a CSA/eCSA Information Element (IE) 405, which may be configured to indicate a current channel of the AP.

In some demonstrative aspects, as shown in FIG. 4, CSA/eCSA IE 405 may indicate a same operating channel/class for a target channel and the current channel.

In some demonstrative aspects, as shown in FIG. 4, CSA/eCSA IE 405 may indicate a count in number of beacons, for example, until the time at which the AP will become unavailable, e.g., a switch time.

In some demonstrative aspects, as shown in FIG. 4, the frame may include a Max Channel Switch Time element 407, which may include a switch time field to define a timing of a link re-enablement of the AP.

For example, Max Channel Switch Time element 407 may be configured to indicate a time, e.g., a time T, during which the AP will be unavailable after the switch time indicated in CSA/eCSA IE 405. For example, the AP may be available again after the time T.

Figure 5:
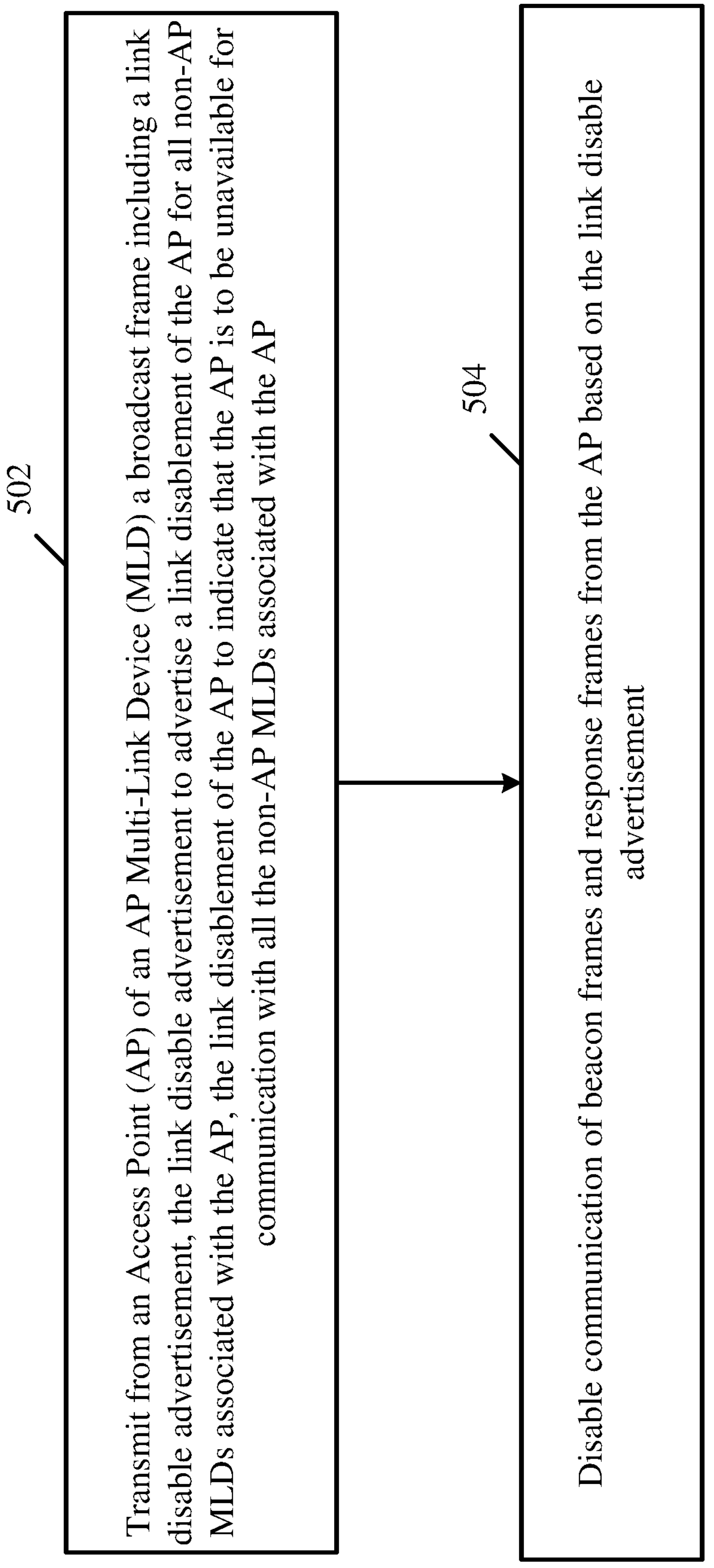
FIG. 5 is a schematic flow-chart illustration of a method of link disablement of an Access Point (AP), in accordance with some demonstrative aspects.

Reference is made to FIG. 5, which schematically illustrates a method of link disablement of an AP, in accordance with some demonstrative aspects. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include transmitting from an AP of an AP MLD a broadcast frame including a link disable advertisement, the link disable advertisement to advertise a link disablement of the AP for all non-AP MLDs associated with the AP. For example, the link disablement of the AP may indicate that the AP is to be unavailable for communication with all the non-AP MLDs associated with the AP. For example, controller 124 (FIG. 1) may be configured to cause, trigger, and/or control AP MLD 131 (FIG. 1) to transmit from AP 135 (FIG. 1) the broadcast frame including the link disable advertisement, e.g., as described above.

As indicated at block 504, the method may include disabling communication of beacon frames and response frames from the AP, for example, based on the link disable advertisement. For example, controller 124 (FIG. 1) may be configured to cause, trigger, and/or control AP MLD 131 (FIG. 1) to disable communication of beacon frames and/or response frames from AP 135 (FIG. 1), for example, based on the link disable advertisement, e.g., as described above.

Figure 6:
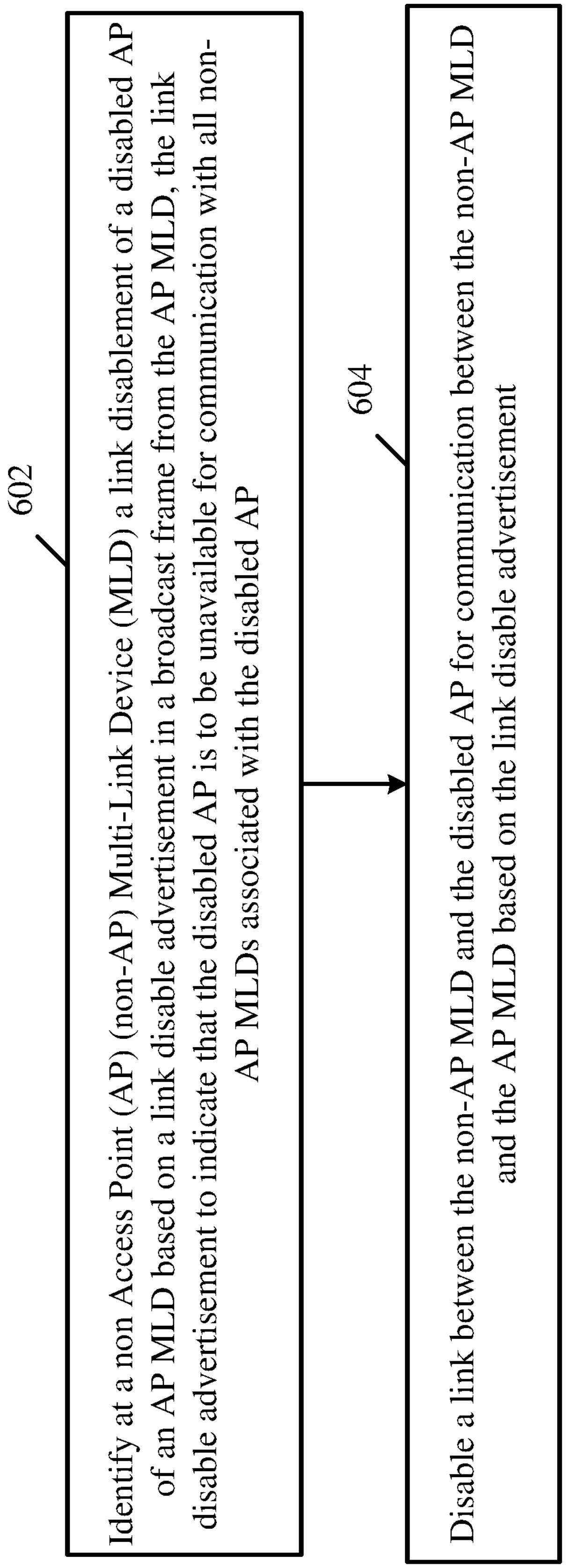
FIG. 6 is a schematic flow-chart illustration of a method of link disablement of an AP, in accordance with some demonstrative aspects.

Reference is made to FIG. 6, which schematically illustrates a method of link disablement of an AP, in accordance with some demonstrative aspects. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include identifying, at a non-AP MLD, a link disablement of a disabled AP of an AP MLD, for example, based on a link disable advertisement in a broadcast frame from the AP MLD. For example, the link disable advertisement may indicate that the disabled AP is to be unavailable for communication with all non-AP MLDs associated with the disabled AP. For example, controller 154 (FIG. 1) may be configured to cause, trigger, and/or control non-AP MLD 151 (FIG. 1) to identify a link disablement of a disabled AP 135 (FIG. 1) of AP MLD 131 (FIG. 1), for example, based on a link disable advertisement in a broadcast frame from AP MLD 131 (FIG. 1), e.g., as described above.

As indicated at block 604, the method may include disabling a link between the non-AP MLD and the disabled AP for communication between the non-AP MLD and the AP MLD, for example, based on the link disable advertisement. For example, controller 154 (FIG. 1) may be configured to cause, trigger, and/or control non-AP MLD 151 (FIG. 1) to disable the link between non-AP MLD 151 (FIG. 1) and the disabled AP 135 (FIG. 1) for communication between non-AP MLD 151 (FIG. 1) and AP MLD 131 (FIG. 1), for example, based on the link disable advertisement, e.g., as described above.

Figure 7:
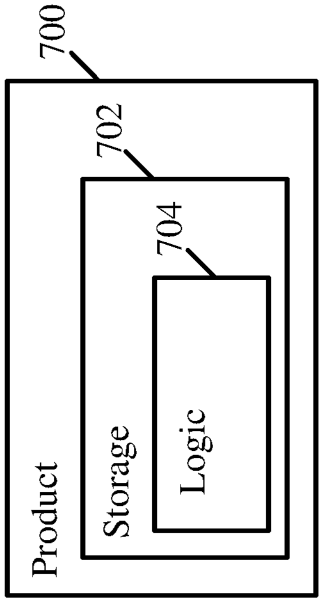
FIG. 7 is a schematic illustration of a product of manufacture, in accordance with some demonstrative aspects.

Reference is made to FIG. 7, which schematically illustrates a product of manufacture 700, in accordance with some demonstrative aspects. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, and/or 6, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 700 and/or machine readable storage media 702 may include one or more types of computer-readable storage media capable of storing data, including volatile memory, non-volatile memory, removable or non-removable memory, erasable or non-erasable memory, writeable or re-writeable memory, and the like. For example, machine readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, and/or the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and/or the like.

EXAMPLES

The following examples pertain to further aspects.

Example 1 includes an apparatus comprising logic and circuitry configured to cause an Access Point (AP) Multi-Link Device (MLD) to transmit from an AP of the AP MLD a broadcast frame comprising a link disable advertisement, the link disable advertisement to advertise a link disablement of the AP for all non-AP MLDs associated with the AP, the link disablement of the AP to indicate that the AP is to be unavailable for communication with all the non-AP MLDs associated with the AP; and disable communication of beacon frames and response frames from the AP based on the link disable advertisement.

Example 2 includes the subject matter of Example 1, and optionally, wherein the apparatus is configured to cause the AP MLD to transmit from another AP of the AP MLD the link disable advertisement to advertise a link disablement of the AP to be unavailable for communication.

Example 3 includes the subject matter of Example 1 or 2, and optionally, wherein the apparatus is configured to cause the AP MLD to transmit from all APs of the AP MLD the link disable advertisement to advertise a link disablement of the of the AP to be unavailable for communication.

Example 4 includes the subject matter of any one of Examples 1-3, and optionally, wherein the apparatus is configured to cause the AP MLD to determine whether the link disablement of the AP is allowed based on a condition corresponding to the non-AP MLDs associated with the AP.

Example 5 includes the subject matter of Example 4, and optionally, wherein the condition is configured to prohibit the link disablement of the AP based on a determination that a non-AP MLD has only one link with the AP MLD, and the only one link is between the non-AP MLD and the AP.

Example 6 includes the subject matter of Example 4 or 5, and optionally, wherein the condition is configured to prohibit the link disablement of the AP based on a determination that a legacy device, which is a non-MLD device, is associated with the AP.

Example 7 includes the subject matter of any one of Examples 4-6, and optionally, wherein the condition is configured to allow the disablement of the AP only based on a determination that there is no non-AP MLD having only one link with the AP MLD, and the only one link is between the non-AP MLD and the AP; and there is no legacy device, which is a non-MLD device, associated with the AP.

Example 8 includes the subject matter of any one of Examples 1-7, and optionally, wherein the link disable advertisement is to indicate to a non-AP MLD that a link between the non-AP MLD and the AP is to be disabled for any Uplink (UL) or Downlink (DL) communication by the non-AP MLD.

Example 9 includes the subject matter of any one of Examples 1-8, and optionally, wherein the link disable advertisement is to indicate to a non-AP MLD that a link between the non-AP MLD and the AP is not to be used by the non-AP MLD.

Example 10 includes the subject matter of any one of Examples 1-9, and optionally, wherein the link disable advertisement is to indicate to a non-AP MLD that a link between the non-AP MLD and the AP is not to be used by the non-AP MLD, even if the link between the non-AP MLD and the AP is enabled per a Traffic Identifier (TID) to link (TID-to-link) mapping negotiation between the non-AP MLD and the AP MLD.

Example 11 includes the subject matter of any one of Examples 1-7, and optionally, wherein the link disable advertisement is to indicate to a non-AP MLD that a Traffic Identifier (TID) to link (TID-to-link) mapping is to be updated by the non-AP MLD to identify that no TIDs are mapped to a link of the AP.

Example 12 includes the subject matter of any one of Examples 1-11, and optionally, wherein the apparatus is configured to cause the AP MLD to transmit from the AP a first broadcast frame comprising the link disable advertisement; disable communication of beacon frames and response frames from the AP based on the link disable advertisement in the first broadcast frame; transmit from the AP a second broadcast frame comprising a link re-enable advertisement to advertise a link re-enablement of the AP, the second broadcast frame after the first broadcast frame; and re-enable communication of beacon frames and response frames from the AP based on the link re-enable advertisement in the second broadcast frame.

Example 13 includes the subject matter of any one of Examples 1-12, and optionally, wherein the apparatus is configured to cause the AP MLD to configure the link disable advertisement to indicate a timing of a link re-enablement of the AP.

Example 14 includes the subject matter of any one of Examples 1-13, and optionally, wherein the apparatus is configured to cause the AP MLD to configure the link disable advertisement comprising a Channel Switch Announcement (CSA) element and a Max Channel Switch Time element, wherein the CSA element is to indicate a current channel of the AP, the Max Channel Switch Time element comprising a switch time field to define a timing of a link re-enablement of the AP.

Example 15 includes the subject matter of any one of Examples 1-14, and optionally, wherein the broadcast frame comprises a beacon frame.

Example 16 includes the subject matter of any one of Examples 1-15, and optionally, comprising at least one radio to transmit the broadcast frame.

Example 17 includes the subject matter of Example 16, and optionally, comprising one or more antennas connected to the radio, and a processor to execute instructions of an operating system of the AP MLD.

Example 18 includes an apparatus comprising logic and circuitry configured to cause a non Access Point (AP) (non-AP) Multi-Link Device (MLD) to identify a link disablement of a disabled AP of an AP MLD based on a link disable advertisement in a broadcast frame from the AP MLD, the link disable advertisement to indicate that the disabled AP is to be unavailable for communication with all non-AP MLDs associated with the disabled AP; and based on the link disable advertisement, disable a link between the non-AP MLD and the disabled AP for communication between the non-AP MLD and the AP MLD.

Example 19 includes the subject matter of Example 18, and optionally, wherein the apparatus is configured to cause the non-AP MLD to, based on the link disable advertisement, disable the link between the non-AP MLD and the disabled AP for any Uplink (UL) or Downlink (DL) communication by the non-AP MLD.

Example 20 includes the subject matter of Example 18 or 19, and optionally, wherein the apparatus is configured to cause the non-AP MLD to, based on the link disable advertisement, select not to use the link between the non-AP MLD and the disabled AP, even if the link between the non-AP MLD and the disabled AP is enabled per a Traffic Identifier (TID) to link (TID-to-link) mapping negotiation between the non-AP MLD and the AP MLD.

Example 21 includes the subject matter of any one of Examples 18-20, and optionally, wherein the apparatus is configured to cause the non-AP MLD to, based on the link disable advertisement, update a Traffic Identifier (TID) to link (TID-to-link) mapping to identify that no TIDs are mapped to the link between the non-AP MLD and the disabled AP.

Example 22 includes the subject matter of any one of Examples 18-21, and optionally, wherein the apparatus is configured to cause the non-AP MLD to identify a link re-enablement of the disabled AP based on a link re-enable advertisement in an other broadcast frame from the AP MLD, and, based on the link re-enable advertisement, re-enable the link between the non-AP MLD and the disabled AP for communication between the non-AP MLD and the AP MLD.

Example 23 includes the subject matter of Example 22, and optionally, wherein the apparatus is configured to cause the non-AP MLD to, based on the link re-enable advertisement, re-enable the link between the non-AP MLD and the disabled AP for any Uplink (UL) or Downlink (DL) communication by the non-AP MLD.

Example 24 includes the subject matter of Example 22 or 23, and optionally, wherein the apparatus is configured to cause the non-AP MLD to, based on the link re-enable advertisement, select to use the link between the non-AP MLD and the disabled AP, based on enabling of the link between the non-AP MLD and the disabled AP per a Traffic Identifier (TID) to link (TID-to-link) mapping negotiation between the non-AP MLD and the AP MLD.

Example 25 includes the subject matter of any one of Examples 22-24, and optionally, wherein the apparatus is configured to cause the non-AP MLD to, based on the link re-enable advertisement, update a Traffic Identifier (TID) to link (TID-to-link) mapping to identify that all TIDs are mapped to the link between the non-AP MLD and the disabled AP.

Example 26 includes the subject matter of any one of Examples 18-25, and optionally, wherein the apparatus is configured to cause the non-AP MLD to determine a timing of a link re-enablement of the disabled AP based on the link disable advertisement.

Example 27 includes the subject matter of any one of Examples 18-26, and optionally, wherein the apparatus is configured to cause the non-AP MLD to identify the link disable advertisement based on a Channel Switch Announcement (CSA) element and a Max Channel Switch Time element in the broadcast frame, the CSA element to indicate a current channel of the disabled AP, the Max Channel Switch Time element comprising a switch time field to define a timing of a link re-enablement of the disabled AP.

Example 28 includes the subject matter of any one of Examples 18-27, and optionally, wherein the broadcast frame comprises a beacon frame.

Example 29 includes the subject matter of any one of Examples 18-28, and optionally, comprising at least one radio to receive the broadcast frame.

Example 30 includes the subject matter of Example 29, and optionally, comprising one or more antennas connected to the radio, and a processor to execute instructions of an operating system of the non-AP MLD.

Example 31 comprises a wireless communication device comprising the apparatus of any one of Examples 1-30.

Example 32 comprises an apparatus comprising means for executing any of the described operations of any one of Examples 1-30.

Example 32 comprises a product comprising one or more tangible computer-readable non-transitory storage media comprising computer-executable instructions operable to, when executed by at least one processor, enable the at least one processor to cause a computing device to perform any of the described operations of any one of Examples 1-30.

Example 33 comprises an apparatus comprising: a memory interface; and processing circuitry configured to: perform any of the described operations of any one of Examples 1-30.

Example 34 comprises a method comprising any of the described operations of any one of Examples 1-30.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a processor configured to cause an Access Point (AP) Multi-Link Device (MLD) to:

transmit from an AP of the AP MLD a broadcast frame comprising a link disable advertisement, the link disable advertisement to advertise a link disablement of the AP for all non-AP MLDs associated with the AP MLD, the link disablement of the AP to indicate that a link of the AP is to be disabled for communication for all the non-AP MLDs associated with the AP MLD, wherein the link disable advertisement is configured to indicate a time duration of a time period during which the link of the AP is to be disabled for all the non-AP MLDs; and disable communication of beacon frames and response frames from the AP based on the link disable advertisement; and a memory to store information processed by the processor.

2. The apparatus of claim 1 configured to cause the AP MLD to transmit from another AP of the AP MLD the link disable advertisement to advertise the link disablement of the link of the AP.

3. The apparatus of claim 1 configured to cause the AP MLD to transmit from all APs of the AP MLD the link disable advertisement to advertise the link disablement of the link of the AP.

4. The apparatus of claim 1 configured to cause the AP MLD to determine whether the link disablement of the AP is allowed based on a condition corresponding to the non-AP MLDs associated with the AP.

5. The apparatus of claim 4, wherein the condition is configured to prohibit the link disablement of the AP based on a determination that a non-AP MLD has only one link with the AP MLD, and the only one link is between the non-AP MLD and the AP.

6. The apparatus of claim 4, wherein the condition is configured to prohibit the link disablement of the AP based on a determination that a legacy device, which is a non-MLD device, is associated with the AP.

7. The apparatus of claim 4, wherein the condition is configured to allow the disablement of the AP only based on a determination that:

there is no non-AP MLD having only one link with the AP MLD, and the only one link is between the non-AP MLD and the AP; and there is no legacy device, which is a non-MLD device, associated with the AP.

8. The apparatus of claim 1, wherein the link disable advertisement is to indicate to a non-AP MLD that the link of the AP is to be disabled for any Uplink (UL) or Downlink (DL) communication by the non-AP MLD.

9. The apparatus of claim 1, wherein the link disable advertisement is to indicate to a non-AP MLD that the link of the AP is not to be used by the non-AP MLD.

10. The apparatus of claim 1, wherein the link disable advertisement is to indicate to a non-AP MLD that the link of the AP is not to be used by the non-AP MLD, even if the link of the AP is enabled per a Traffic Identifier (TID) to link (TID-to-link) mapping negotiation between the non-AP MLD and the AP MLD.

11. The apparatus of claim 1, wherein the link disable advertisement is to indicate to a non-AP MLD that a Traffic Identifier (TID) to link (TID-to-link) mapping is to identify that no TIDs are mapped to the link of the AP.

12. The apparatus of claim 1 configured to cause the AP MLD to:

transmit from the AP a first broadcast frame comprising the link disable advertisement;

disable communication of beacon frames and response frames from the AP based on the link disable advertisement in the first broadcast frame;

transmit from the AP a second broadcast frame comprising a link re-enable advertisement to advertise a link re-enablement of the AP, the second broadcast frame after the first broadcast frame; and re-enable communication of beacon frames and response frames from the AP based on the link re-enable advertisement in the second broadcast frame.

13. The apparatus of claim 1 configured to cause the AP MLD to configure the link disable advertisement comprising a first field configured to indicate a time at which the time period is to begin, and a second field configured to indicate the time duration of the time period during which the link of the AP is to be disabled for all the non-AP MLDs.

14. The apparatus of claim 1 configured to cause the AP MLD to configure the link disable advertisement comprising a Channel Switch Announcement (CSA) element and a Max Channel Switch Time element, wherein the CSA element is to indicate a current channel of the AP, the Max Channel Switch Time element comprising a switch time field to define a timing of a link re-enablement of the AP.

15. The apparatus of claim 1, wherein the broadcast frame comprises a beacon frame.

16. The apparatus of claim 1 comprising at least one radio to transmit the broadcast frame from the AP.

17. The apparatus of claim 16 comprising one or more antennas connected to the radio, and another processor to execute instructions of an operating system of the AP MLD.

18. A product comprising one or more tangible computer-readable non-transitory storage media comprising computer-executable instructions operable to, when executed by at least one processor, enable the at least one processor to cause an Access Point (AP) Multi-Link Device (MLD) to:

transmit from an AP of the AP MLD a broadcast frame comprising a link disable advertisement, the link disable advertisement to advertise a link disablement of the AP for all non-AP MLDs associated with the AP MLD, the link disablement of the AP to indicate that a link of the AP is to be disabled for communication for all the non-AP MLDs associated with the AP MLD, wherein the link disable advertisement is configured to indicate a time duration of a time period during which the link of the AP is to be disabled for all the non-AP MLDs; and disable communication of beacon frames and response frames from the AP based on the link disable advertisement.

19. The product of claim 18, wherein the instructions, when executed, cause the AP MLD to transmit from all APs of the AP MLD the link disable advertisement to advertise the link disablement of the link of the AP.

20. The product of claim 18, wherein the link disable advertisement is to indicate to a non-AP MLD that a Traffic Identifier (TID) to link (TID-to-link) mapping is to identify that no TIDs are mapped to the link of the AP.

* * * * *